US010012260B2

(12) United States Patent
Ishihara et al.

(10) Patent No.: US 10,012,260 B2
(45) Date of Patent: Jul. 3, 2018

(54) CRANKSHAFT FOR RECIPROCATING ENGINE

(71) Applicant: NIPPON STEEL & SUMITOMO METAL CORPORATION, Tokyo (JP)

(72) Inventors: Koichiro Ishihara, Kyoto (JP); Kenji Imanishi, Kishiwada (JP); Ken Yoshino, Nishinomiya (JP); Kunihiro Yabuno, Matsubara (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 135 days.

(21) Appl. No.: 15/028,445

(22) PCT Filed: Oct. 14, 2014

(86) PCT No.: PCT/JP2014/005198
§ 371 (c)(1),
(2) Date: Apr. 11, 2016

(87) PCT Pub. No.: WO2015/056440
PCT Pub. Date: Apr. 23, 2015

(65) Prior Publication Data
US 2016/0258476 A1 Sep. 8, 2016

(30) Foreign Application Priority Data
Oct. 16, 2013 (JP) .................................. 2013-215232

(51) Int. Cl.
F16C 3/20 (2006.01)
F16C 3/08 (2006.01)
F16C 3/06 (2006.01)

(52) U.S. Cl.
CPC ................. F16C 3/20 (2013.01); F16C 3/06 (2013.01); F16C 3/08 (2013.01)

(58) Field of Classification Search
CPC ................. F16C 3/06; F16C 3/08; F16C 3/20
See application file for complete search history.

(56) References Cited

U.S. PATENT DOCUMENTS 2,196,422 A * 4/1940 Meyer ...................... F16C 3/08
74/605
4,356,741 A 11/1982 Schoepf et al.

FOREIGN PATENT DOCUMENTS

DE 102009039301 A1 * 3/2011 ................ F16C 3/06
FR 2162770 7/1973
JP 02-4018 1/1990
(Continued)

Primary Examiner — Thomas C Diaz
(74) Attorney, Agent, or Firm — Clark & Brody

(57) ABSTRACT

A crankshaft includes: journals that define a central axis of rotation; crank pins that are eccentric with respect to the journals; and crank arms for connecting the journals and the crank pins, wherein each of the crank arms or at least one of the crank arms integrally includes a counterweight. The crank arms have a recess in a surface adjacent to a corresponding one of the journals, the recess disposed inward of a peripheral region along a periphery of the surface, the recess disposed along the peripheral region. With this configuration, it is possible to provide a crankshaft which has reduced weight and increased torsional rigidity in combination with increased flexural rigidity.

10 Claims, 10 Drawing Sheets

(56) References Cited

FOREIGN PATENT DOCUMENTS

| | | |
|---|---|---|
| JP | 04-11913 U | 1/1992 |
| JP | 2000-320531 | 11/2000 |
| JP | 2004-538429 | 12/2004 |
| JP | 2004-538430 | 12/2004 |
| JP | 2010-230027 | 10/2010 |
| JP | 2012-007726 | 1/2012 |
| JP | 4998233 | 8/2012 |

* cited by examiner

FIG.2
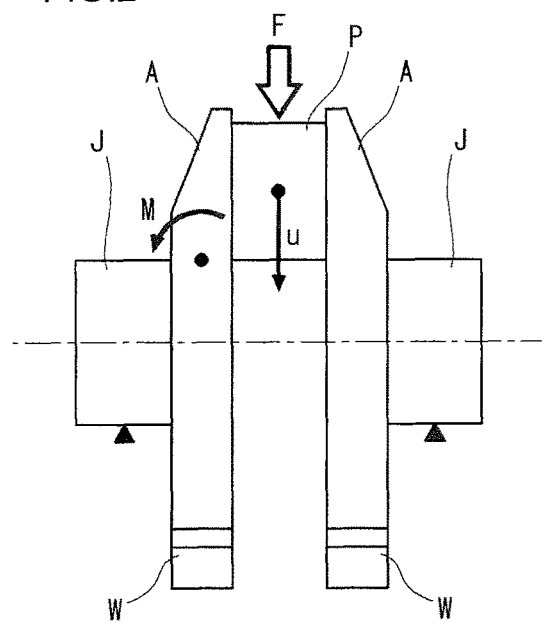
FIG.3
(a)
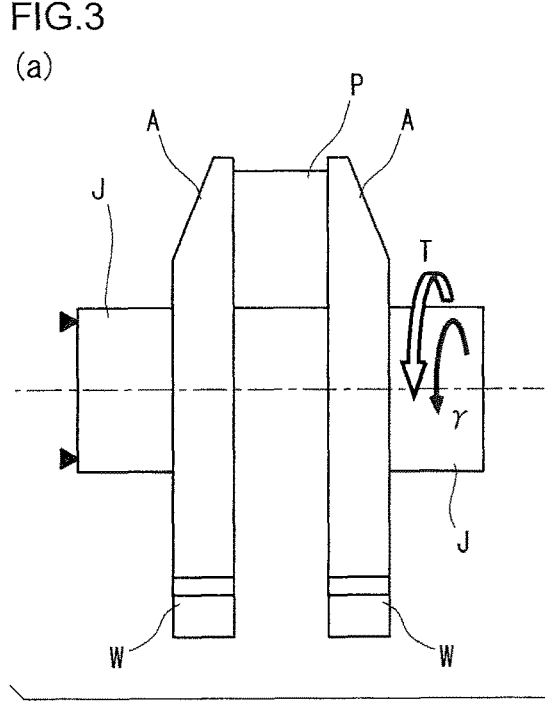
(b)
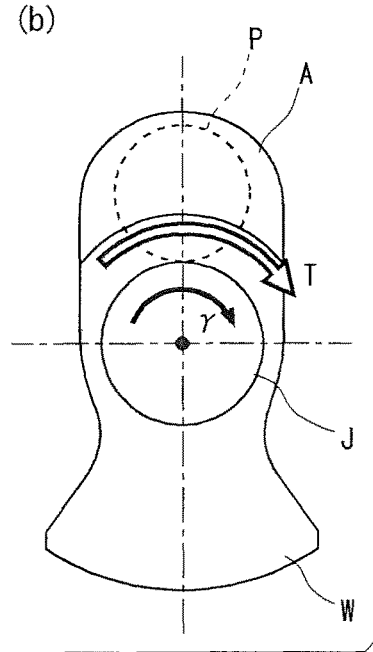

(a) RECTANGULAR TYPE    (b) PROJECTED TYPE    (c) RECESSED TYPE (a) RECTANGULAR TYPE  (b) PROJECTED TYPE  (c) RECESSED TYPE

CRANKSHAFT FOR RECIPROCATING ENGINE

TECHNICAL FIELD

The present invention relates to a crankshaft to be mounted in reciprocating engines such as automotive engines, marine engines, and multi-purpose engines used in, for example, power generators.

BACKGROUND ART

A reciprocating engine requires a crankshaft for converting the reciprocating motion of pistons in cylinders to rotational motion so as to extract power. Crankshafts are generally categorized into two classes: the type manufactured by die forging and the type manufactured by casting. For multiple cylinder engines having two or more cylinders in particular, the firstly mentioned die forged crankshafts, which have higher strength and stiffness, are often employed.

FIG. 1 is a schematic side view of a common crankshaft for multiple cylinder engines. A crankshaft 1 shown in FIG. 1 is designed to be mounted in a 4 cylinder engine and includes: five journals J1 to J5; four crank pins P1 to P4; a front part Fr, a flange F1, and eight crank arms A1 to A8 (hereinafter also referred to as "crank arm") that connect the journals J1 to J5 and the crank pins P1 to P4 to each other. The crankshaft 1 is configured such that all of the eight crank anus A1 to A8 are formed integrally with counterweights W1 to W8 (hereinafter also referred to as "counterweight"), respectively, and is referred to as a 4-cylinder 8-counterweight crankshaft.

Hereinafter, when the journals J1 to J5, the crank pins P1 to P4, the crank arms A1 to A8, and the counterweights W1 to W8 are each collectively referred to, the reference character "J" is used for the journals, "P" for the crank pins, "A" for the crank arms, and "W" for the counterweights. A crank pin P and a pair of crank arms A (including the counterweights W) which connect with the crank pin P are also collectively referred to as a "throw".

The counterweight W may be included in each of the crank arms A, but instead may be included in at least one of the crank arms A. For example, in some of those crankshafts to be mounted in a 4 cylinder engine, of all the eight crank arms A, the leading first crank arm A1, the trailing eighth crank arm A8, and the central two crank arms (fourth crank arm A4 and fifth crank arm A5) are provided with the counterweight W. In such a case, the remaining second, third, sixth, and seventh crank arms A2, A3, A6, A7 do not include the counterweight W. Such crankshafts are referred to as a 4-cylinder 4-counterweight crankshaft.

The journals J, front part Fr, and flange F1 are arranged coaxially with the center of rotation of the crankshaft 1. The crank pins P are arranged at positions eccentric with respect to the center of rotation of the crankshaft 1 by half the distance of the piston stroke. The journals J are supported by the engine block by means of sliding bearings and serve as the central rotational axis. The big end of a connecting rod (hereinafter referred to as "connecting rod") is coupled to the crank pin P by means of a sliding bearing, and a piston is coupled to the small end of the connecting rod. The front part Fr constitutes the front end portion of the crankshaft 1. A damper pulley 2 for driving a timing belt, a fan belt, and the like is attached to the front part Fr. The flange F1 constitutes the rear end portion of the crankshaft 1. A flywheel 3 is attached to the flange F1.

In an engine, fuel explodes within cylinders. The combustion pressure generated by the explosion causes the reciprocating motion of the pistons, which acts on the crank pins P of the crankshaft 1 and concurrently is transmitted to the journals J via each crank arm A connecting to a corresponding one of the crank pins P, so as to be converted into rotational motion. In this process, the crankshaft 1 rotates while repetitively undergoing elastic deformation.

The bearings that support the journals of the crankshaft are supplied with lubricating oil. In response to the inclination and the elastic deformation of the crankshaft, the oil film pressure and the oil film thickness in the bearings vary in correlation with the bearing load and the journal center orbit. Furthermore, depending on the surface roughness of the journals and the surface roughness of the bearing metal in the bearings, not only the variation of the oil film pressure but also local metal-to metal contact occurs. Ensuring a sufficient oil film thickness is important in order to prevent seizure of the bearings due to lack of lubrication and to prevent local metal-to-metal contact, thus affecting the fuel economy performance.

In addition, the elastic deformation caused by the rotation of the crankshaft and the movement of the center orbit in the clearances within the bearings cause an offset of the center of rotation, and therefore affect the engine vibration (mount vibration). Further more, the vibration propagates through the vehicle body and thus affects the vehicle interior noise and the ride comfort.

In order to improve such engine performance properties, there is a need for a crankshaft having high stiffness with the ability to resist deformation. In addition, there is a need for weight reduction of the crankshaft.

Crankshafts are subjected to loads due to pressure in cylinders (combustion pressure in cylinders) and centrifugal force of rotation. In order to impart deformation resistance to the loads, an attempt is made to improve the torsional rigidity and flexural rigidity. In designing a crankshaft, the main specifications such as the journal diameter, crank pin diameter, and crank pin stroke are firstly determined. After determination of the main specifications, the remaining region to be designed is the shape of the crank arm. Thus, the design of the crank arm shape for increasing both the torsional rigidity and the flexural rigidity is an important requirement.

In the meantime, crankshafts need to have a mass distribution that ensures static balance and dynamic balance so as to be able to rotate kinematically smoothly as a rotating body. Accordingly, an important requirement is to adjust the mass of the counterweight region with respect to the mass of the crank arm region determined by the requirements for the flexural rigidity and torsional rigidity in view of weight reduction while ensuring the static balance and dynamic balance.

For the static balance, the adjustment is made so that when the mass moments of inertia (the "mass" multiplied by the "radius of the center of mass") of the crank arm region and the counterweight region are summed, the result is zero. For the dynamic balance, the adjustment is made so that, when, for each region, the product of the axial distance from the reference point to the center of mass multiplied by the mass moment of inertia (the "mass" multiplied by the "radius of the center of mass" multiplied by the "axial distance") is determined using a point on the rotation axis of the crankshaft as the reference and the products are summed, the result is zero.

Furthermore, the balance ratio is adjusted for balancing against the load of combustion pressure within one throw (a region of the crankshaft corresponding to one cylinder). The balance ratio is defined as a ratio of the mass moment of inertia of the counterweight region to the mass moment of inertia of the crank arm region including the crank pin (also including part of the connecting rod, strictly speaking) in the crankshaft, and this balancing ratio is adjusted to fall within a certain range.

There is a trade-off between increase of the stiffness of the crank arm of a crankshaft and weight reduction thereof, but heretofore various techniques relating to the crank arm shape have been proposed in an attempt to meet both needs. Such conventional techniques include the following.

Japanese Patent No. 4998233 (Patent Literature 1) discloses a crank arm having intensively greatly depressed recess grooves in the crank pin-side surface of the crank arm and the journal-side surface thereof on a straight line connecting the axis of the journal to the axis of the crank pin (hereinafter also referred to as the "crank arm centerline"). The crank arm disclosed in Patent Literature 1 is intended to achieve weight reduction and increase of stiffness. The recess groove in the journal-side surface contributes to weight reduction by virtue of the reduced mass, and moreover, the thick region around the recess groove contributes to increasing the torsional rigidity. However, in reality, the flexural rigidity cannot be substantially increased because of the intensively greatly depressed recess grooves on the crank arm centerline.

Japanese Translation of PCT International Application Publication No. 2004-538429 (Patent Literature 2), Japanese Translation of PCT International Application Publication No. 2004-538430 (Patent Literature 3), Japanese Patent Application Publication No. 2012-7726 (Patent Literature 4), and Japanese Patent Application Publication No. 2010-230027 (Patent Literature 5) each disclose a crank arm having a greatly and deeply depressed hollow portion in the journal-side surface of the crank arm on the crank arm centerline. The crank arms disclosed in Patent Literatures 2 to 5 are also intended to achieve weight reduction and increase of torsional rigidity. However, in reality, the flexural rigidity is reduced because of the greatly and deeply depressed hollow portion on the crank arm centerline.

CITATION LIST

Patent Literature

Patent Literature 1: Japanese Patent No. 4998233
Patent Literature 2: Japanese Translation of PCT International Application Publication No. 2004-538429
Patent Literature 3: Japanese Translation of PCT International Application Publication No. 2004-538430
Patent Literature 4: Japanese Patent Application Publication No. 2012-7726
Patent Literature 5: Japanese Patent Application Publication No. 2010-230027

SUMMARY OF INVENTION

Technical Problem

With the techniques disclosed in Patent Literatures 1 to 5, it is possible to provide a crankshaft with reduced weight and increased torsional rigidity. However, the conventional techniques have their limits in increasing flexural rigidity of crankshafts, and therefore technological innovation therefor is strongly desired.

The present invention has been made in view of the above circumstances. An object of the present invention is to provide a crankshaft for reciprocating engines which has reduced weight and increased torsional rigidity in combination with increased flexural rigidity.

Solution to Problem

A crankshaft for a reciprocating engine, according to an embodiment of the present invention, includes: journals that define a central axis of rotation; crank pins that are eccentric with respect to the journals; and crank arms, each of the crank arms connecting a corresponding one of the journals to a corresponding one of the crank pins, wherein each of the crank arms or at least one of the crank arms integrally includes a counterweight. The crank arms have a recess in a surface adjacent to the corresponding one of the journals, the recess disposed inward of a peripheral region along a periphery of the surface, the recess disposed along the peripheral region.

The above-described crankshaft may be configured such that the recess extends to a portion of the peripheral region, the portion corresponding to an area in the corresponding one of the crank pins, the area extending from an axis of the crank pin to an eccentrically top portion of the crank pin.

The crankshaft may be configured such that the recess extends to an area of the peripheral region, the area corresponding to the top portion. Alternatively, the configuration may be such that the recess extends to a side area of the peripheral region. Alternatively, the configuration may be such that the recess extends to two side areas of the peripheral region, the recess being symmetrical with respect to a line connecting an axis of the corresponding one of the journals to the axis of the corresponding one of the crank pins.

The above-described crankshaft may be configured such that, of all the crank arms, a crank arm not having the counterweight has a recess in a surface adjacent to the corresponding one of the crank pins, the recess disposed inward of a peripheral region along a periphery of the surface, the recess disposed along the peripheral region.

Advantageous Effects of Invention

According to the present invention, the crank arm is provided with a recess formed in the journal-side surface, so that the peripheral region of the crank arm is thick, the region inward thereof is thin because of the recess, and the central region further inward thereof is thick. With this configuration, it is possible to provide a crankshaft which has reduced weight and increased torsional rigidity in combination with increased flexural rigidity.

BRIEF DESCRIPTION OF DRAWINGS

FIG. 2 is a schematic diagram illustrating a method for evaluating the flexural rigidity of a crank arm;
FIGS. 3(a) and 3(b) are schematic diagrams illustrating a method for evaluating the torsional rigidity of a crank arm, wherein
FIG. 3(a) is a side view of a throw and FIG. 3(b) is a front view thereof in the axial direction;
FIGS. 4(a) to 4(c) are diagrams showing typical examples in which the crank arm is assumed to be a simple circular plate, wherein
FIG. 4(a) shows a circular plate having a rectangular cross section,
FIG. 4(b) shows a circular plate having a projected cross section,
and FIG. 4(c) shows a circular plate having a recessed cross section;

FIGS. 5(a) to 5(c) are diagrams showing typical examples in which the crank arm is assumed to be a simple beam, wherein FIG. 5(a) shows a beam having a rectangular cross section, FIG. 5(b) shows a beam having a projected cross section, and FIG. 5(c) shows a beam having a recessed cross section;

FIGS. 7(a) to 7(e) are schematic views showing a crank arm shape in a crankshaft according to a first embodiment of the present invention, wherein FIG. 7(a) is a front view of the crank arm as seen from the journal region in the axial direction, FIG. 7(b) is a cross-sectional view taken along the line A-A, FIG. 7(c) is a cross-sectional view taken along the line B-B, FIG. 7(d) is a cross-sectional view taken along the line C-C, and FIG. 7(e) is a cross-sectional view taken along the line D-D;

FIGS. 8(a) to 8(e) are schematic views showing a crank arm shape in a crankshaft according to a second embodiment of the present invention, wherein FIG. 8(a) is a front view of the crank arm as seen from the journal region in the axial direction, FIG. 8(b) is a cross-sectional view taken along the line E-E, FIG. 8(c) is a cross-sectional view taken along the line F-F, FIG. 8(d) is a cross-sectional view taken along the line G-G, and FIG. 8(e) is a cross-sectional view taken along the line H-H;

FIGS. 9(a) to 9(e) are schematic views showing a crank arm shape in a crankshaft according to a third embodiment of the present invention, wherein FIG. 9(a) is a front view of the crank arm as seen from the journal region in the axial direction, FIG. 9(b) is a cross-sectional view taken along the line I-I, FIG. 9(c) is a cross-sectional view taken along the line J-J, FIG. 9(d) is a cross-sectional view taken along the line K-K, and FIG. 9(e) is a cross-sectional view taken along the line L-L;

FIGS. 10(a) to 10(e) are schematic views showing a crank arm shape in a crankshaft according to a fourth embodiment of the present invention, wherein FIG. 10(a) is a front view of the crank arm as seen from the journal region in the axial direction, FIG. 10(b) is a cross-sectional view taken along the line M-M, FIG. 10(c) is a cross-sectional view taken along the line N-N, FIG. 10(d) is a cross-sectional view taken along the line O-O, and FIG. 10(e) is a cross-sectional view taken along the line P-P; and FIGS. 11(a) to 11(e) are schematic views showing a crank arm shape in a crankshaft according to a fifth embodiment of the present invention, wherein FIG. 11(a) is a front view of the crank arm as seen from the crank pin region in the axial direction, FIG. 11(b) is a cross-sectional view taken along the line Q-Q, FIG. 11(c) is a cross-sectional view taken along the line R-R, FIG. 11(d) is a cross-sectional view taken along the line S-S, and FIG. 11(e) is a cross-sectional view taken along the line T-T.

DESCRIPTION OF EMBODIMENTS

Figure 1:
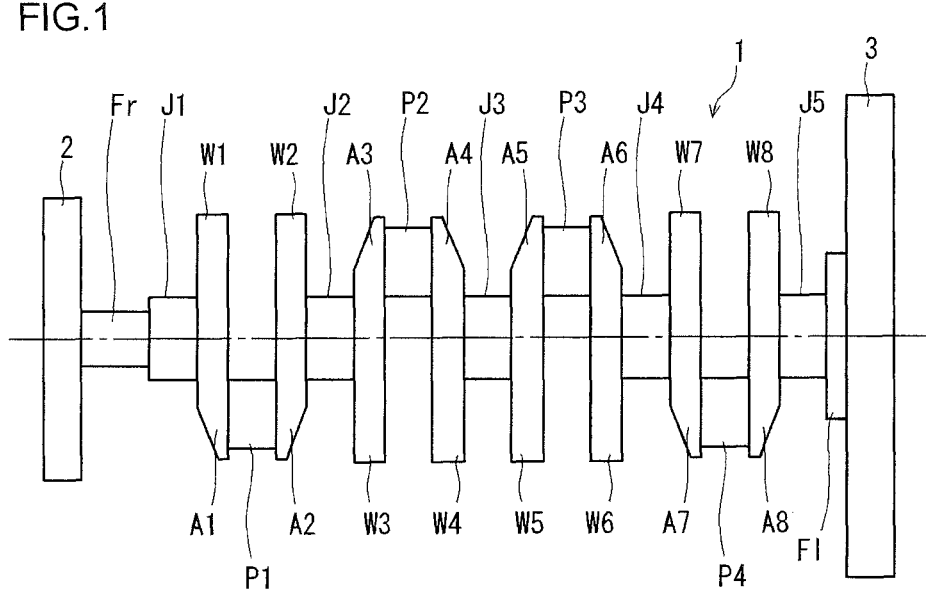
FIG. 1 is a schematic side view of a common crankshaft for multiple cylinder engines.

Embodiments of the crankshaft for reciprocating engines according to the present invention will now be described.
1. Basic Techniques to be Considered in Designing Crankshaft
1-1. Flexural Rigidity of Crank Arm FIG. 2 is a schematic diagram illustrating a method for evaluating the flexural rigidity of a crank arm. As shown in FIG. 2, in each throw of the crankshaft, a load F of combustion pressure generated by the explosion in the cylinder is applied to the crank pin P via a connecting rod. Since the journals J at the opposite ends in each throw are supported by bearings, the load F is transmitted to the journal bearings from the crank pin P via the crank arms A. Thus, the crank arms A are placed in a state in which the load of three-point bending is applied thereto with a bending moment M acting on the crank arms A. Accordingly, in each crank arm A, compressive stress occurs at the outside (the side adjacent to the journal J) in the thickness direction and tensile stress occurs at the inside opposite thereto (the side adjacent to the pin P).

In the case where the diameters of the crank pin P and the journal J have been determined as design specifications, the flexural rigidity of the crank arm A depends on the crank arm shape of each throw. The counterweight W seldom contributes to the flexural rigidity. The displacement u of the axial center of the crank pin P in the direction in which the combustion pressure is applied is proportional to the load F of combustion pressure applied to the crank pin P and is inversely proportional to the flexural rigidity as shown in the following formula (1).

$$u \text{ proportional to } F/(\text{Flexural Rigidity}) \quad (1)$$

1-2. Torsional Rigidity of Crank Arm

FIGS. 3(a) and 3(b) are schematic diagrams illustrating a method for evaluating the torsional rigidity of a crank arm, wherein FIG. 3(a) is a side view of a throw and FIG. 3(b) is a front view thereof in the axial direction. The rotation of the crankshaft about the journal J causes a torsional torque T as shown in FIGS. 3(a) and 3(b). Thus, it is necessary to enhance the torsional rigidity of the crank arm A in order to ensure smooth rotation against the torsional vibrations of the crankshaft without causing resonance.

In the case where the diameters of the crank pin P and the journal J have been determined as design specifications, the torsional rigidity of the crank arm A depends on the crank arm shape of each throw. The counterweight W seldom contributes to the torsional rigidity. The torsion angle $\gamma$ of the journal J is proportional to the torsional torque T and inversely proportional to the torsional rigidity as shown in the following formula (2).

$$\gamma \text{ proportional to } T/(\text{Torsional Rigidity}) \quad (2)$$

2. Crankshaft of Present Embodiment
2-1. Approach to Increasing Stiffness of Crank Arm As stated above, the counterweight seldom contributes to the flexural rigidity and torsional rigidity. Accordingly, the present embodiment provides a crank arm shape that can achieve weight reduction and increase of flexural rigidity in combination with increase of torsional rigidity
2-1-1. Shape for Increasing Torsional Rigidity Here, an exemplary shape for increasing the torsional rigidity is studied based on the theory of Strength of Materials. For the crank arm A shown in FIGS. 3(a) and 3(b), an effective way to increase its torsional rigidity while maintaining reduced weight is to increase its polar moment of inertia.

Figure 4:
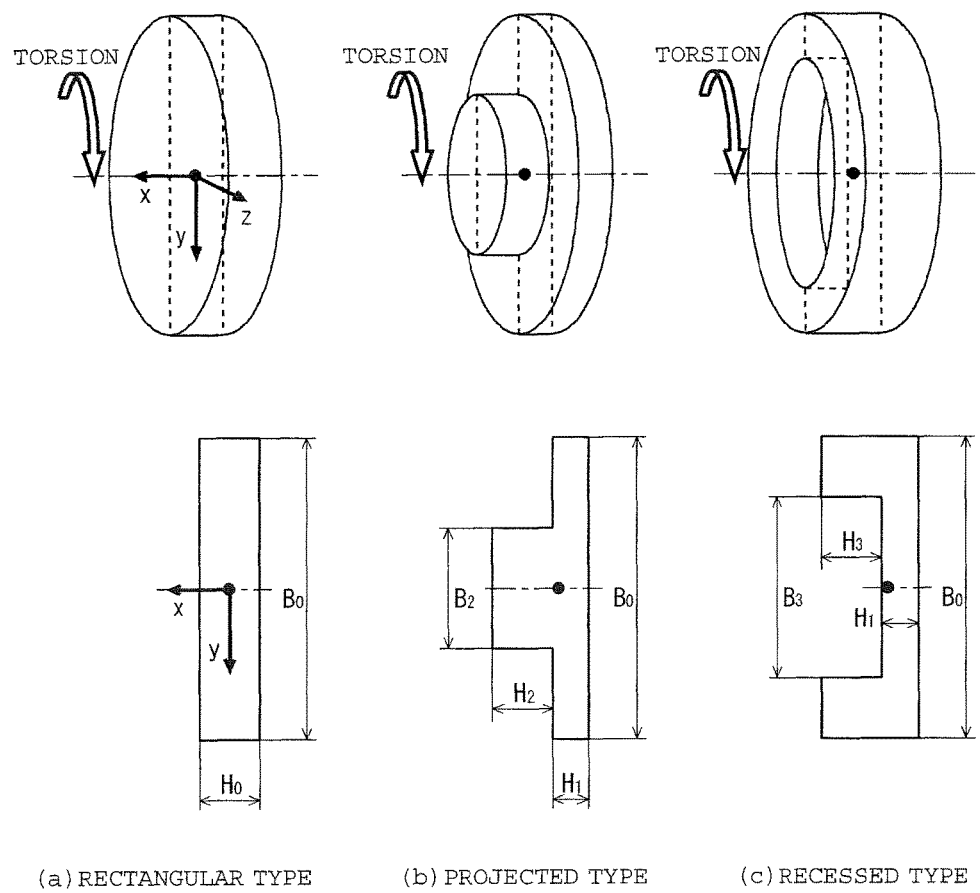

FIGS. 4(a) to 4(c) are diagrams showing typical examples in which the crank arm is assumed to be a simple circular plate from the standpoint of torsional rigidity in the sense of Strength of Materials, wherein FIG. 4(a) shows a circular plate having a rectangular cross section, FIG. 4(b) shows a circular plate having a projected cross section, and FIG. 4(c) shows a circular plate having a recessed cross section. The rectangular cross section type circular plate shown in FIG.

4(a), the projected cross section type circular plate shown in FIG. 4(b), and the recessed cross section type circular plate shown in FIG. 4(c) are assumed to be of equal weight taking into account the maintenance of reduced weight. In other words, these circular plates are of equal volume in spite of the varied cross sections in rectangular, projected, and recessed shapes.

Specifically, the rectangular cross section type circular plate shown in FIG. 4(a) has a rectangular cross-sectional shape with a thickness of $H_0$ and a diameter of $B_0$. The projected cross section type circular plate shown in FIG. 4(b) has a projected cross-sectional shape in which the central portion projects with respect to the outer peripheral portion, with the outermost diameter being $B_0$. The projection in the central portion has a thickness of $H_2$ and a diameter of $B_2$, and the outer peripheral portion has a thickness of $H_1$. The recessed cross section type circular plate shown in FIG. 4(c) has a recessed cross-sectional shape in which the central portion is recessed with respect to the outer peripheral portion, with the outermost diameter being $B_0$. The central portion has a thickness of $H_1$ with the depth of the recession being $H_3$ and the diameter of the recession being $B_3$.

The magnitude relationship between the torsional rigidities of the respective circular plates is investigated under the condition that they are of equal weight. In general, according to the theory of Strength of Materials, there is a relationship between the torsional rigidity, the polar moment of inertia, and the torsion angle as shown in the following formulae (3) to (5). The relationship shown in the formulae indicates that increasing the polar moment of inertia is effective at increasing the torsional rigidity.

$$\text{Torsional rigidity: } G \times J/L \tag{3}$$

$$\text{Polar moment of inertia: } J = (\pi/32) \times d^4 \tag{4}$$

$$\text{Torsion angle: } \gamma = T \times L/(G \times J) \tag{5}$$

where L represents the axial length, G represents the shear modulus, d represents the radius of the round bar, and T represents the torsional torque.

The condition that the three types of circular plates shown in FIGS. 4(a) to 4(c) are of equal weight means the condition that they are of equal volume. Accordingly, the relationship indicated by the following formula (6) is established among the dimensional parameters of the three types of circular plates.

$$(\pi/4) \times B_0 \times B_0 \times H_0 = (\pi/4) \times (B_0 \times B_0 \times H_1 + B_2 \times B_2 \times H_2) = (\pi/4) \times \{B_0 \times B_0 \times (H_1 + H_3) - B_3 \times B_3 \times H_3\} \tag{6}$$

The polar moments of inertia of the three types of circular plates are expressed by the following formulae (7) to (9), respectively, taking into account the thicknesses.

Polar moment of inertia of a rectangular cross section type circular plate:

$$J_{(A)} = (\pi/32) \times H_0 \times B_0^4 \tag{7}$$

Polar moment of inertia of a projected cross section type circular plate:

$$J_{(B)} = (\pi/32) \times (H_1 \times B_0^4 + H_2 \times B_2^4) \tag{8}$$

Polar moment of inertia of a recessed cross section type circular plate:

$$J_{(C)} = (\pi/32) \times \{(H_1 + H_3) \times B_0^4 - H_3 \times B_3^4\} \tag{9}$$

Based on the formulae (7) to (9), the magnitude relationship between the polar moment of inertia $J_{(A)}$ of a rectangular cross section type circular plate, the polar moment of inertia $J_{(B)}$ of a projected cross section type circular plate, and the polar moment of inertia $J_{(C)}$ of a recessed cross section type circular plate is expressed by the following formula (10).

$$J_{(B)} < J_{(A)} < J_{(C)} \tag{10}$$

This formula (10) is the conclusion drawn theoretically from Strength of Materials. This conclusion can be understood from the observation in the sense of Strength of Materials that, qualitatively speaking, a cross-sectional shape such that materials are placed in greater proportion in locations farther from the torsion center provides a higher polar moment of inertia.

For example, a case is considered as an illustrative example in which the dimensional parameters are set as follows so that the condition of the equal weight, i.e., the condition of the above formula (6) can be satisfied: $B_0=100$ mm, $H_0=20$ mm, $H_1 10$ mm, $H_2=H_3=20$ mm, and $B_2=B_3=100/\sqrt{2}=70.71$ mm.

In the case of this illustrative example, the polar moment of inertia $J_{(A)}$ of a rectangular cross section type circular plate is determined as shown in the following formula (11) according to the above formula (7).

$$J_{(A)} = 1.96 \times 10^8 \tag{11}$$

The polar moment of inertia $J_{(B)}$ of a projected cross section type circular plate is determined as shown in the following formula (12) according to the above formula (8).

$$J_{(B)} = 1.47 \times 10^8 \tag{12}$$

The polar moment of inertia $J_{(C)}$ of a recessed cross section type circular plate is determined as shown in the following formula (13) according to the above formula (9).

$$J_{(C)} = 2.45 \times 10^8 \tag{13}$$

The formulae (11) to (13) numerically confirm that the relationship expressed by the above formula (10) holds.

Thus, projected cross section type circular plates, rectangular cross section type circular plates, and recessed cross section type circular plates are in ascending order in magnitude of torsional rigidity against torsional loads, and therefore the shape of recessed cross section type circular plates is most preferred.

2-1-2. Shape for Increasing Flexural Rigidity

Here, an exemplary shape for increasing the flexural rigidity is studied based on the theory of Strength of Materials. For the crank arm A shown in FIG. 2, an efficient way to increase its flexural rigidity while maintaining reduced weight is to increase its area moment of inertia against bending.

Figure 5:
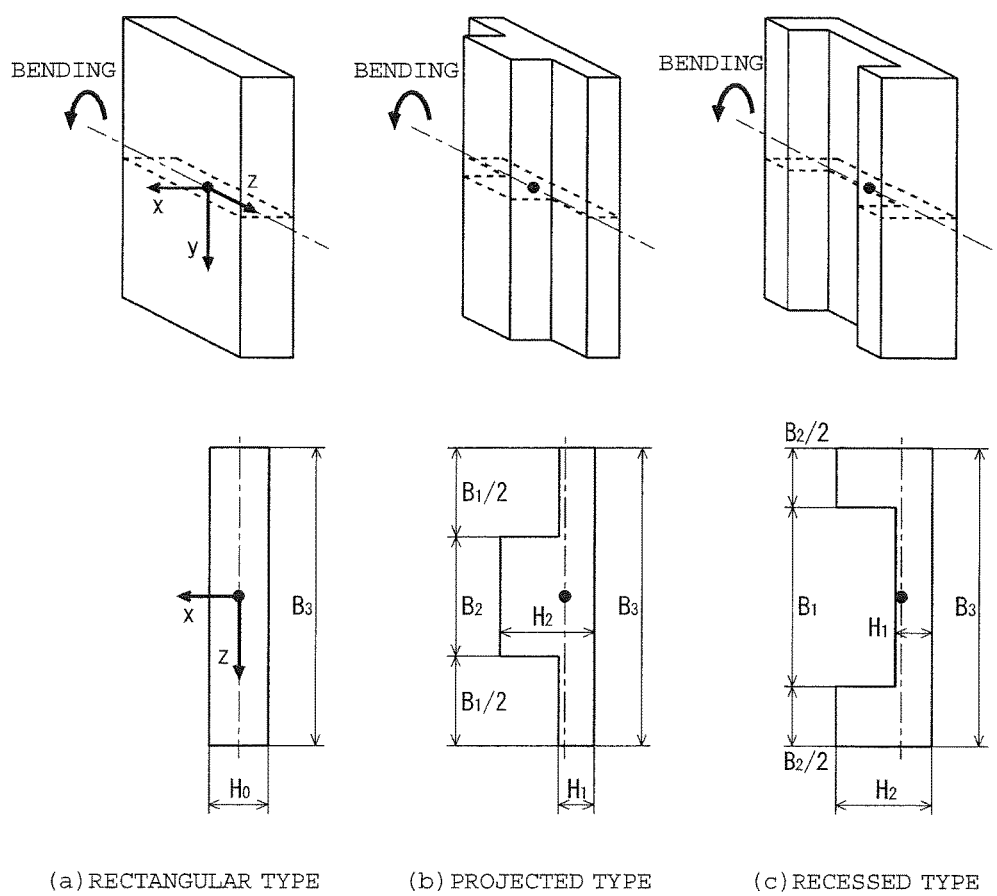

FIGS. 5(a) to 5(c) are diagrams showing typical examples in which the cross-sectional shape of the crank arm is simplified and the crank arm is assumed to be a simple beam from the standpoint of flexural rigidity in the sense of Strength of Materials, wherein FIG. 5(a) shows a beam having a rectangular cross section, FIG. 5(b) shows a beam having a projected cross section, and FIG. 5(c) shows a beam having a recessed cross section. The rectangular cross section type beam shown in FIG. 5(a), the projected cross section type beam shown in FIG. 5(b), and the recessed cross section type beam shown in FIG. 5(c) are assumed to be of equal weight taking into account the maintenance of reduced weight. In other words, these beams are of equal cross-sectional area in spite of the varied cross sections in rectangular, projected, and recessed shapes.

Specifically, the rectangular cross section type beam shown in FIG. 5(a) has a rectangular cross-sectional shape with a thickness of $H_0$ and a width of $B_3$. The projected cross section type beam shown in FIG. 5(b) has a projected cross-sectional shape in which the central portion projects with respect to the opposite side portions, with the maximum width being $B_3$. The central portion has a thickness of $H_2$ and a width of $B_2$, and the opposite side portions each have a thickness of $H_1$ and a width of $B_1/2$. The recessed cross section type beam shown in FIG. 5(c) has a recessed cross-sectional shape in which the central portion is recessed with respect to the opposite side portions, with the maximum width being $B_3$. The central portion has a thickness of $H_1$ and a width of $B_1$, and the opposite side portions each have a thickness of $H_2$ and a width of $B_2/2$.

The magnitude relationship between the stiffnesses of the respective beams against bending loads is investigated under the condition that they are of equal weight. In general, the relationship between the flexural rigidity of a rectangular beam and the area moment of inertia thereof is expressed by the following formulae (14) to (16) based on the theory of Strength of Materials. The relationship shown in the formulae indicates that increasing the area moment of inertia results in increasing the flexural rigidity.

Flexural Rigidity: $E \times I$ (14)

Area moment of inertia: $I = (1/12) \times b \times h^3$ (15)

Flexural displacement: $u = k(M/(E \times I))$ (16)

where b represents the width, h represents the thickness, E represents the Young's modulus, M represents the bending moment, and k represents the shape factor.

The condition that the three types of beams shown in FIGS. 5(a) to 5(c) are of equal weight means the condition that they are of equal volume, i.e., they are of equal cross-sectional area. Accordingly, the relationship indicated by the following formula (17) is established among the dimensional parameters of the three types of beams.

$B_3 \times H_0 = (H_2 \times B_2 + B_1 \times H_1) = (H_2 \times B_2 + B_1 \times H_1)$ (17)

The area moments of inertia of the three types of beams are expressed by the following formulae (18) to (20), respectively.

Area moment of inertia of a rectangular cross section type beam:

$I_{(D)} = (1/12) \times B_3 \times H_0^3$ (18)

Area moment of inertia of a projected cross section type beam:

$I_{(E)} = 1/3 \times (B_3 \times E_2^3 - B_1 \times H_3^3 + B_2 \times B_1^3)$ (19)

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

Area moment of inertia of a recessed cross section type beam:

$I_{(F)} = 1/3 \times (B_3 \times E_2^3 - B_1 \times H_3^3 + B_2 \times E_1^3)$ (20)

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - B_2$", $H_3$ is determined by "$E_2 - H_1$".

The above formula (19) and the above formula (20) are in the same form. This indicates that the area moment of inertia $I_{(E)}$ of a projected cross section type beam equals the area moment of inertia $I_{(F)}$ of a recessed cross section type beam under the condition that they are of equal weight.

In short, the magnitude relationship between the area moment of inertia $I_{(D)}$ of a rectangular cross section type beam, the area moment of inertia $I_{(E)}$ of a projected cross section type beam, and the area moment of inertia $I_{(F)}$ of a recessed cross section type beam is expressed by the following formula (21).

$I_{(D)} < I_{(E)} = I_{(F)}$ (21)

This formula (21) is the conclusion drawn theoretically from Strength of Materials. This conclusion can be understood from the observation in the sense of Strength of Materials that, qualitatively speaking, a cross-sectional shape such that materials are placed in greater proportion in locations farther from the neutral plane of bending provides a higher area moment of inertia.

For example, a case is considered as an illustrative example in which the dimensional parameters are set as follows so that the condition of the equal weight, i.e., the condition of the above formula (17) can be satisfied: $B_1 = B_2 = 50$ mm, $B_3 = 100$ mm, $H_0 = 20$ mm, $H_1 = 10$ mm, and $H_2 = 30$ mm, by which $E_1 = 12.5$ mm, $E_2 = 17.5$ mm, and $H_3 = 7.5$ mm.

In the case of this illustrative example, the area moment of inertia $I_{(D)}$ of a rectangular cross section type beam is determined as shown in the following formula (22) according to the above formula (18).

$I_{(D)} = 6.67 \times 10^4$ (22)

The area moment of inertia $I_{(E)}$ of a projected cross section type beam is determined as shown in the following formula (23) according to the above formula (19).

$I_{(E)} = 2.04 \times 10^5$ (23)

The area moment of inertia $I_{(F)}$ of a recessed cross section type beam is determined as shown in the following formula (24) according to the above formula (20).

$I_{(F)} = 2.04 \times 10^5$ (24)

The formulae (22) to (24) numerically confirm that the relationship expressed by the above formula (21) holds.

Thus, projected cross section type beams and recessed cross section type beams have comparable flexural rigidity against bending loads, and therefore partially thickened crank arm shapes such as those of a projected cross section type beam and a recessed cross section type beam are more preferred because of the higher flexural rigidity than the shape of a rectangular cross section type beam.

Figure 6:
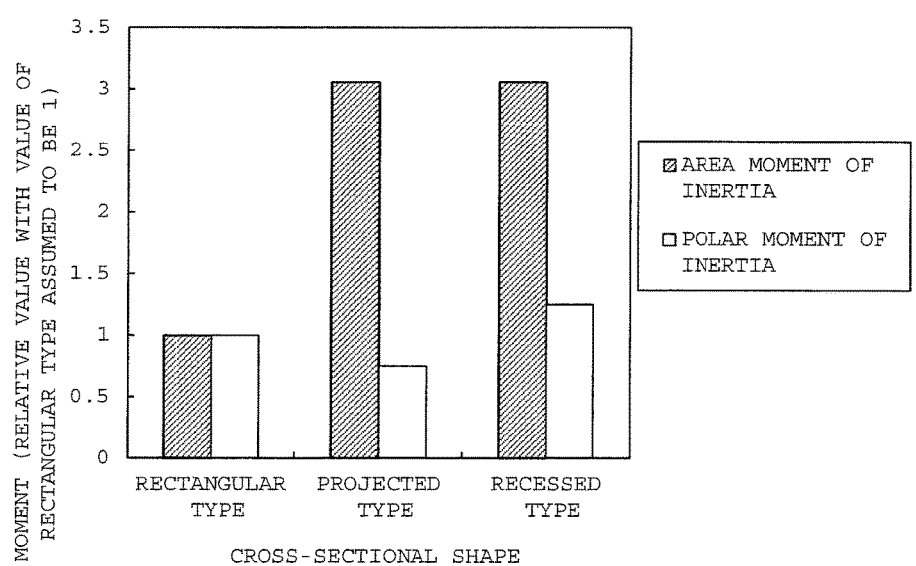
FIG. 6 is a graph summarizing the magnitude relationships between the area moments of inertia and between the polar moments of inertia, for the respective cross-sectional shapes.

2-1-3. Summarization of Shapes for Increasing Flexural Rigidity and Torsional Rigidity FIG. 6 is a graph summarizing the magnitude relationships between the area moments of inertia and between the polar moments of inertia, which are directly related to flexural rigidity and torsional rigidity, for the respective cross-sectional shapes. In FIG. 6, the polar moments of inertia and the area moments of inertia resulting from the cross sectional shapes shown in FIGS. 4(a) to 4(c) and FIGS. 5(a) to 5(c), i.e., the rectangular cross section, the projected cross section, and the recessed cross section, are presented as relative values assuming that the values of the rectangular cross section are the reference "1".

The results shown in FIG. 6 indicate that, in order to increase both the flexural rigidity and the torsional rigidity effectively, an efficient way is to increase the thickness of the crank arm. In particular, the projected or recessed cross-sectional shape results in increased flexural rigidity while the recessed cross-sectional shape results in increased torsional rigidity, and therefore it is believed that, when these shapes are combined, both the flexural rigidity and the torsional rigidity increase.

2-2. Overview of Crankshaft of Present Embodiment

The results shown in FIG. 6 demonstrate that an effective way to increase both the flexural rigidity and the torsional rigidity is to configure the crank arm to have a cross-sectional shape such that the projected cross section and the recessed cross section are combined. Specifically, the peripheral region along the periphery of the crank arm is configured to be thick, the region inward of the peripheral region is configured to be thin, and the central region further inward thereof (a region through which the crank arm centerline passes and which is adjacent to the journal) is configured to be thick. By configuring the peripheral region, which is farther from the torsion center of the crank arm, to be thick and configuring the region inward thereof to be thin, it is possible to ensure high torsional rigidity while achieving weight reduction. The large thickness of the peripheral region of the crank arm contributes to ensuring the flexural rigidity. In addition, for the purpose of ensuring the flexural rigidity, the large thickness of the central region of the crank arm contributes.

In view of the above, the crankshaft according to the present embodiment is provided with the crank arms each having a recess in the journal-side surface thereof, inside the peripheral region thereof which extends along the periphery of the surface (in particular portions of the peripheral region corresponding to the two sides of the crank arm), in such a manner that the recess is disposed along the peripheral region. Thus, in the crank arms, the peripheral region outside the recess is thick, the region inward thereof is thin because of the recess, and the region further inward thereof is thick, so that weight reduction and increase of the torsional rigidity are achieved while increase of the flexural rigidity is also achieved.

Figure 7:
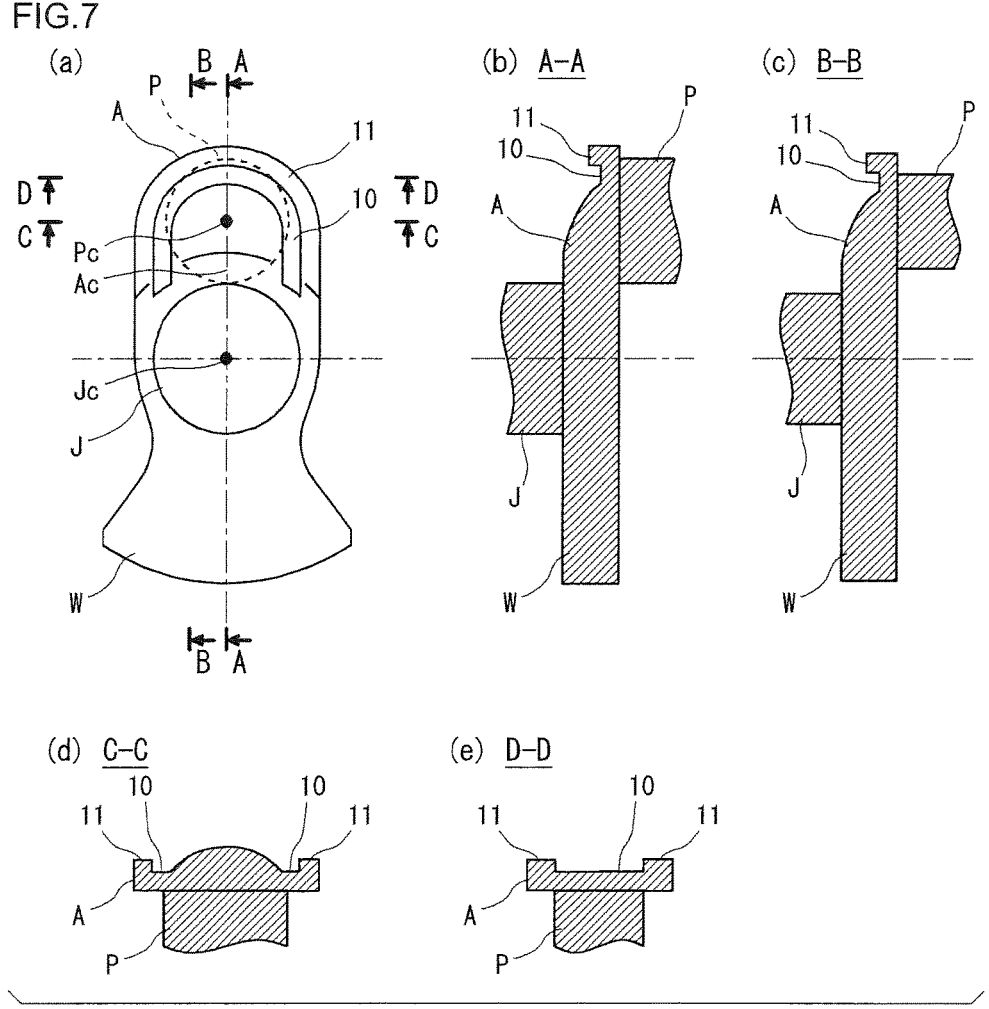

Furthermore, in the case of a crankshaft including a crank arm that does not have a counterweight, the crank arm that does not have a counterweight may have a recess in the crank pin-side surface thereof, inside the peripheral region thereof which extends along the periphery of the surface (in particular portions of the peripheral region corresponding to the two sides of the crank arm), in such a manner that the recess is disposed along the peripheral region. In this case, further weight reduction of the crankshaft is achieved while ensuring increased torsional rigidity and increased flexural rigidity 2-3. Specific Embodiments First Embodiment FIGS. 7(a) to 7(e) are schematic views showing a crank arm shape in a crankshaft according to a first embodiment of the present invention, wherein FIG. 7(a) is a front view of the crank arm as seen from the journal region in the axial direction, FIG. 7(b) is a cross-sectional view taken along the line A-A, FIG. 7(c) is a cross-sectional view taken along the line B-B, FIG. 7(d) is a cross-sectional view taken along the line C-C, and FIG. 7(e) is a cross-sectional view taken along the line D-D. The A-A cross section in FIG. 7(b) is a cross section taken on a crank arm centerline Ac. The B-B cross section in FIG. 7(c) is a cross section parallel to the A-A cross section. The C-C cross section in FIG. 7(d) is a cross section perpendicular to the crank arm centerline Ac and containing the axis Pc of the crank pin, and the D-D cross section in FIG. 7(e) is a cross section parallel to the C-C cross section.

The crank arm A of the first embodiment shown in FIGS. 7(a) to 7(e) has a recess 10 in the surface adjacent to a journal J. Specifically, the crank arm A has a peripheral region 11 along the periphery of the journal J-side surface. The recess 10 is formed inside the peripheral region 11 and along the peripheral region 11. Thus, in the crank arm A, the peripheral region 11 is thick over its entire area, the region inward thereof is thin because of the recess 10, and the central region further inward thereof is thick. As a result, the crankshaft has reduced weight and increased torsional rigidity in combination with increased flexural rigidity.

It should be noted that the pin fillet portion, which is a joint connecting the crank pin P to the crank arm A, is prone to stress concentration. Accordingly, in many cases, quenching using high frequency induction heating is applied to the pin fillet portion in order to increase the fatigue strength. In this process, in the peripheral region 11 of the crank arm A, particularly the area (hereinafter also referred to as "pin top area") corresponding to the eccentrically top portion of the crank pin P may experience quench cracking since it is contiguous with the pin fillet portion, which is subjected to quenching, unless the area has a certain degree of thickness. To guard against such a case, the peripheral region 11 of the crank arm A of the first embodiment has a sufficient thickness over its entire area including the pin top area without any interruption, and therefore has high resistance to quench cracking.

Second Embodiment

Figure 8:
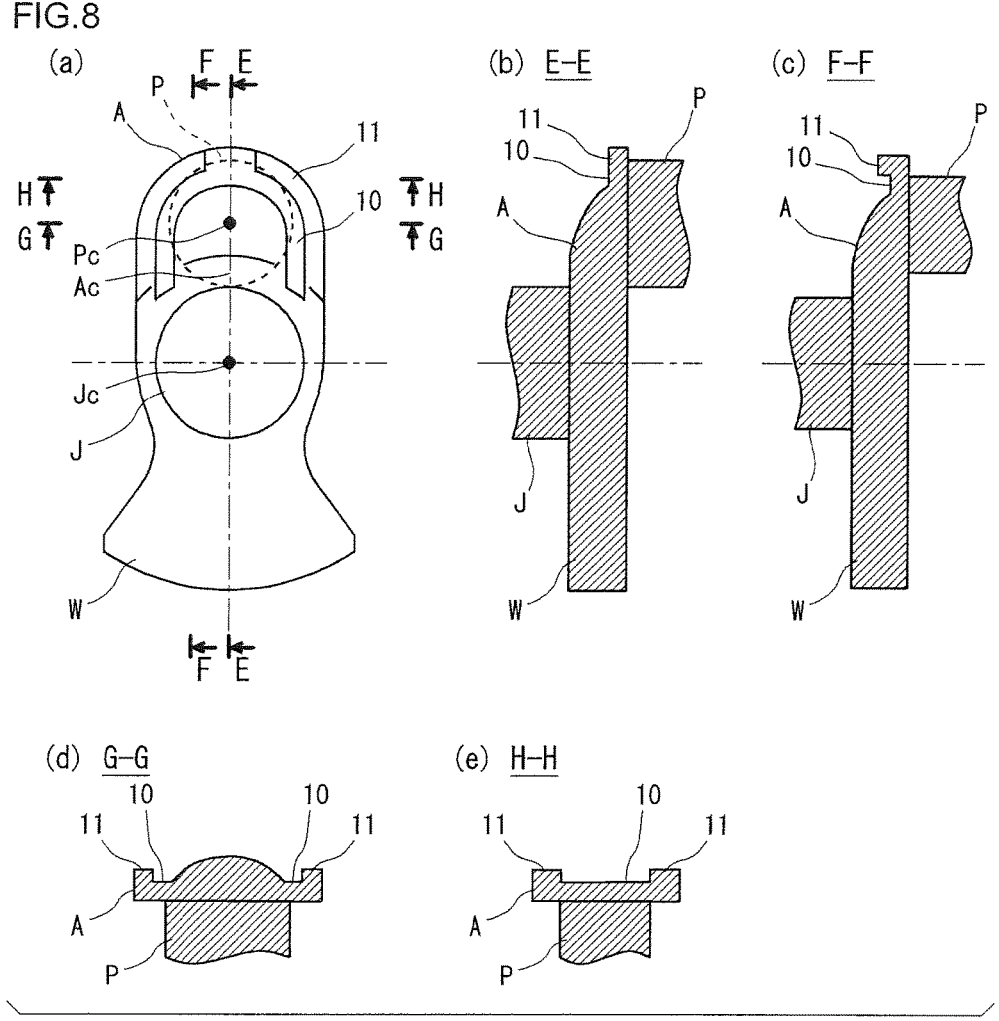

FIGS. 8(a) to 8(e) are schematic views showing a crank arm shape in a crankshaft according to a second embodiment of the present invention, wherein FIG. 8(a) is a front view of the crank arm as seen from the journal region in the axial direction, FIG. 8(b) is a cross-sectional view taken along the line E-E, FIG. 8(c) is a cross-sectional view taken along the line F-F, FIG. 8(d) is a cross-sectional view taken along the line G-G, and FIG. 8(e) is a cross-sectional view taken along the line H-H. The E-E cross section, F-F cross section, G-G cross section, and H-H cross section of FIG. 8(a) correspond to the locations of the A-A cross section, B-B cross section, C-C cross section, and D-D cross section of FIG. 7(a), respectively.

The crank arm A of the second embodiment shown in FIGS. 8(a) to 8(e) is based on the configuration of the crank arm A of the first embodiment shown in FIGS. 7(a) to 7(e), and is a variation thereof with a partially modified configuration. In the second embodiment, as shown in FIGS. 8(a) and 8(b), the recess 10 formed in the journal J-side surface of the crank arm A extends to the area (pin top area) in the peripheral region 11 of the crank arm A, which corresponds with the top portion. That is, the thickness of the peripheral region 11 of the crank arm A is locally thin at the pin top area.

This crank arm A of the second embodiment also has the configuration in which the peripheral region is thick except for part of it, the region inward thereof is thin because of the recess 10, and the central region further inward thereof is thick. Hence, the crankshaft of the second embodiment, similarly to the crankshaft of the first embodiment, has reduced weight and increased torsional rigidity in combination with increased flexural rigidity.

Indeed, when the peripheral region 11 of the crank arm A is partially thinned, the partial thinning leads to a corresponding reduction in torsional rigidity. However, provided that, in the peripheral region 11, the thinned portion of the peripheral region 11 is limited to a zone corresponding to a zone in the crank pin P from the axis Pc thereof to the top portion thereof (this zone of the peripheral region 11 is hereinafter also referred to as "pin top-side zone"), the reduction in torsional rigidity is small and the flexural rigidity is substantially not reduced. Accordingly, when the recess 10 of the crank arm A is to be extended to the peripheral region 11, it is preferred that the extension be limited to the pin top-side zone in the peripheral region 11 and thus that the recess 10 be extended to a portion of the specific pin top-side zone.

In the second embodiment, the thickness of the peripheral region 11 of the crank arm A is thin at the pin top area, and therefore, when the pin fillet portion is subjected to high frequency induction heating for quenching, quench cracking tends to occur at the pin top area of the crank arm A. Thus, the pin top area in the peripheral region 11 of the crank arm A needs to have a minimally required thickness to prevent quench cracking.

Third Embodiment

Figure 9:
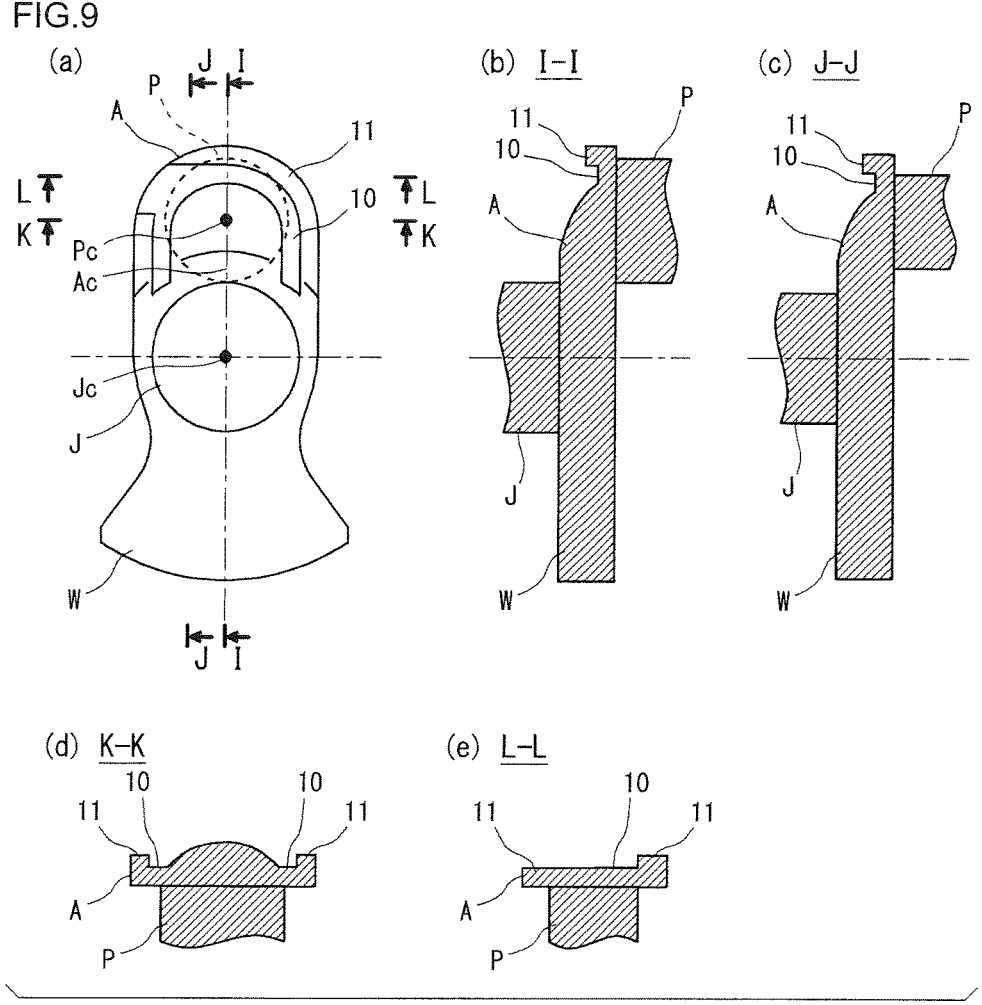

FIGS. 9(a) to 9(e) are schematic views showing a crank arm shape in a crankshaft according to a third embodiment of the present invention, wherein FIG. 9(a) is a front view of the crank arm as seen from the journal region in the axial direction, FIG. 9(b) is a cross-sectional view taken along the line I-I, FIG. 9(c) is a cross-sectional view taken along the line J-J, FIG. 9(d) is a cross-sectional view taken along the line K-K, and FIG. 9(e) is a cross-sectional view taken along the line L-L. The I-I cross section, J-J cross section, K-K cross section, and L-L cross section of FIG. 9(a) correspond to the locations of the A-A cross section, B-B cross section, C-C cross section, and D-D cross section of FIG. 7(a), respectively.

The crank arm A of the third embodiment shown in FIGS. 9(a) to 9(e) is a variation of the crank arm A of the first embodiment shown in FIGS. 7(a) to 7(e) with a partially modified configuration, based on technical ideas similar to those of the above second embodiment. In the third embodiment, as shown in FIGS. 9(a) and 9(e), the recess 10 formed in the journal J-side surface of the crank arm A extends to a portion of one side area in the pin top-side zone of the peripheral region 11 of the crank arm A. That is, the thickness of the peripheral region 11 of the crank arm A is locally thin at a portion of the one side area of the pin top-side zone. The recess 10 may instead extend to the entirety of the one side area in the pin top-side zone of the peripheral region 11 of the crank arm A.

This crank arm A of the third embodiment also has the configuration in which the peripheral region is thick except for part of it, the region inward thereof is thin because of the recess 10, and the central region further inward thereof is thick. Hence, the crankshaft of the third embodiment has advantages similar to those of the crankshaft of the second embodiment.

In the third embodiment, the recess 10 of the crank arm A does not extend to the pin top area of the peripheral region 11. Thus, the crank arm A has a sufficient thickness at the pin top area of the peripheral region 11 and therefore has high resistance to quench cracking that may be caused by high frequency induction heating.

Fourth Embodiment

Figure 10:
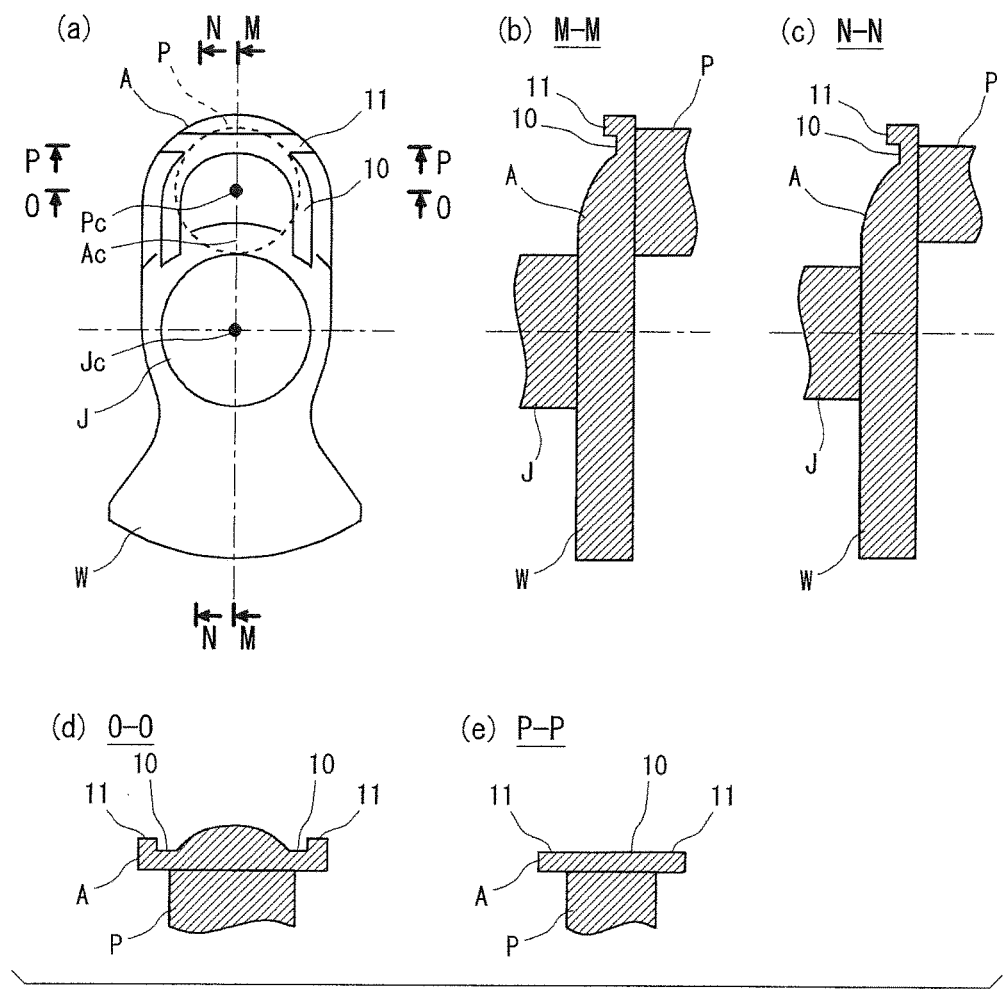

FIGS. 10(a) to 10(e) are schematic views showing a crank arm shape in a crankshaft according to a fourth embodiment of the present invention, wherein FIG. 10(a) is a front view of the crank arm as seen from the journal region in the axial direction, FIG. 10(b) is a cross-sectional view taken along the line M-M, FIG. 10(c) is a cross-sectional view taken along the line N-N, FIG. 10(d) is a cross-sectional view taken along the line O-O, and FIG. 10(e) is a cross-sectional view taken along the line P-P. The M-M cross section, N-N cross section, O-O cross section, and P-P cross section of FIG. 10(a) correspond to the locations of the A-A cross section, B-B cross section, C-C cross section, and D-D cross section of FIG. 7(a), respectively.

The crank arm A of the fourth embodiment shown in FIGS. 10(a) to 10(e) is a variation of the crank arm A of the first embodiment shown in FIGS. 7(a) to 7(e) with a partially modified configuration, based on technical ideas similar to those of the above second embodiment. In the fourth embodiment, as shown in FIGS. 10(a) and 10(e), the recess 10 formed in the journal J-side surface of the crank arm A extends to portions of two respective side areas in the pin top-side zone of the peripheral region 11 of the crank arm A, so as to be symmetrical with respect to the crank arm centerline Ac (the line connecting the axis Jc of the journal J to the axis Pc of the crank pin P). That is, the thickness of the peripheral region 11 of the crank arm A is locally and symmetrically thin at portions of the two respective side areas of the pin top-side zone. The recess 10 may instead extend to the entireties of the two respective side areas in the pin top-side zone of the peripheral region 11 of the crank arm A.

This crank arm A of the fourth embodiment also has the configuration in which the peripheral region is thick except for part of it, the region inward thereof is thin because of the recess 10, and the central region further inward thereof is thick. Hence, the crankshaft of the fourth embodiment has advantages similar to those of the crankshaft of the second embodiment.

In the fourth embodiment, similarly to the third embodiment described above, the recess 10 of the crank arm A does not extend to the pin top area of the peripheral region 11. Thus, the crank arm A has a sufficient thickness at the pin top area of the peripheral region 11 and therefore has high resistance to quench cracking that may be caused by high frequency induction heating.

In any of the above second to fourth embodiments, the radius of the center of mass of the crank arm A region is smaller than in the first embodiment described above because the crank arm A is locally thinned at a portion of the peripheral region 11 (pin top-side zone), which is far from the center of rotation of the crankshaft. Accordingly, the mass moment of inertia of the crank arm A region is reduced, and therefore it is possible to reduce the mass of the counterweight W in light of the static balance and dynamic balance of the crankshaft. Hence, the second to fourth embodiments described above are useful for further weight reduction of a crankshaft as a whole.

Fifth Embodiment

In the first to fourth embodiments described above, not only the crank arm A having a counterweight but also a crank arm A that does not have a counterweight has the recess 10 in the journal J-side surface. In the case of the crank arm that does not have a counterweight, such a recess may be formed in the crank pin P-side surface of the crank arm A.

Figure 11:
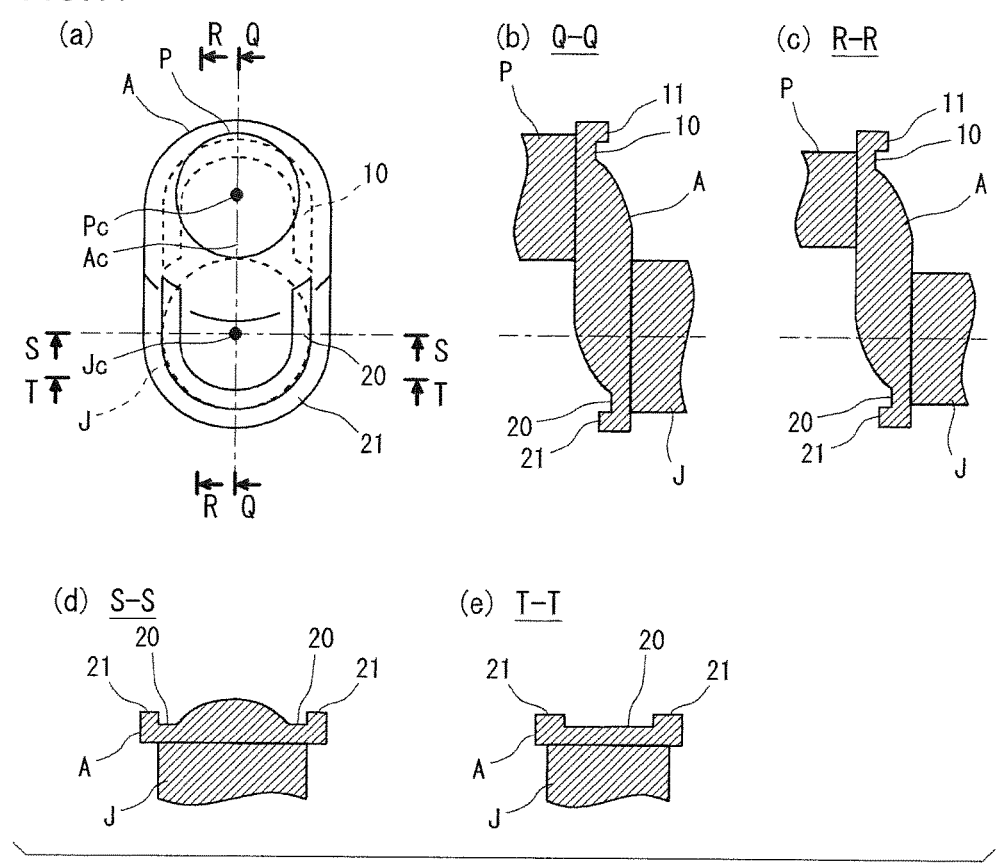

FIGS. 11(a) to 11(e) are schematic views showing a crank arm shape in a crankshaft according to a fifth embodiment of the present invention, wherein FIG. 11(a) is a front view of the crank arm as seen from the crank pin region in the axial direction, FIG. 11(b) is a cross-sectional view taken along the line Q-Q, FIG. 11(c) is a cross-sectional view taken along the line R-R, FIG. 11(d) is a cross-sectional view taken along the line S-S, and FIG. 11(e) is a cross-sectional view taken along the line T-T. The Q-Q cross section in FIG. 11(b) is a cross section taken on the crank arm centerline Ac. The R-R cross section in FIG. 11(c) is a cross section parallel to the Q-Q cross section. The S-S cross section in FIG. 11(d) is a cross section perpendicular to the crank arm centerline Ac and containing the axis Jc of the journal, and the T-T cross section in FIG. 11(e) is a cross section parallel to the S-S cross section. The Q-Q cross section and R-R cross section of FIG. 11(a) correspond to the locations of the A-A cross section and B-B cross section of FIG. 7(a), respectively.

In the fifth embodiment, a crank arm A shown in FIGS. 11(a) to 11(e) does not have a counterweight. In a 4-cylinder 4-counterweight crankshaft, by way of example, the second, third, sixth, and seventh crank arms A2, A3, A6, A7 correspond to the crank arm A.

The crank arm A in the fifth embodiment has a recess 20 in the surface adjacent to the crank pin P in addition to the recess 10 formed in the surface adjacent to the journal J. Specifically, the crank arm A has a peripheral region 21 along the periphery of the crank pin P-side surface. The recess 20 is formed inside the peripheral region 21 and along the peripheral region 21. Thus, in the crank arm A, at the side where the crank pin P is coupled, the peripheral region 11 is thick over its entire area, the region inward thereof is thin because of the recess 10, and the central region further inward thereof is thick. Furthermore, in the crank arm A, at the side where the journal J is coupled, the peripheral region 21 is thick over its entire area, the region inward thereof is thin because of the recess 20, and the central region further inward thereof is thick. As a result, farther weight reduction of the crankshaft is achieved while ensuring increased torsional rigidity and increased flexural rigidity.

The recess 20 of the fifth embodiment is similar in shape to the recess 10 of the first embodiment described above. Instead, the recess 20 of the fifth embodiment may be modified to have a shape similar to that of any of the recesses 10 of the second to fourth embodiments described above.

The crankshaft of the present invention is a crankshaft that can be mounted in a variety of reciprocating engines. That is, the number of engine cylinders may be any of two, three, four, six, eight and ten, or the number greater than that may be possible. The arrangement of engine cylinders may be in a variety of forms such as the straight type, V-type, and opposed type. The fuel for the engine may be of various types such as gasoline, diesel, and biofuel. Examples of the engine include a hybrid engine that includes a combination of an internal combustion engine and an electric motor.

INDUSTRIAL APPLICABILITY

The present invention is capable of being effectively utilized in a crankshaft to be mounted in a variety of reciprocating engines.

REFERENCE SIGNS LIST

1: crankshaft
J, J1 to J5: journal
Jc: axis of journal,
P, P1 to P4: crank pin
Pc: axis of crank pin
Fr: front part
F1: flange
A, A1 to A8: crank arm
Ac: crank arm centerline
W, W1 to W8: counterweight
2: damper pulley
3: flywheel
10: recess
11: peripheral region
20: recess
21: peripheral region

The invention claimed is:

1. A crankshaft for a reciprocating engine, the crankshaft configured to be mounted in a reciprocating engine, the crankshaft comprising:
   journals that define a central axis of rotation;
   crank pins that are eccentric with respect to the journals; and
   crank arms, each of the crank arms connecting a corresponding one of the journals to a corresponding one of the crank pins,
   wherein each of the crank arms or at least one of the crank arms integrally includes a counterweight, and
   wherein the crank arms have a recess in a surface adjacent to the corresponding one of the journals, the recess disposed inward of a peripheral region along a periphery of the surface, the recess disposed along the peripheral region, so that, in the crank arm, a central region inward of the recess when viewed in cross section perpendicular to the crank arm centerline and containing the crank pin axis is thicker than the recess, and wherein the peripheral region is thicker than the recess.

2. The crankshaft for a reciprocating engine according to claim 1,
   wherein the recess extends to a portion of the peripheral region, the portion corresponding to an area in the corresponding one of the crank pins, the area extending from an axis of the crank pin to an eccentrically top portion of the crank pin.

3. The crankshaft for a reciprocating engine according to claim 2,
   wherein the recess extends to an area of the peripheral region, the area corresponding to the top portion.

4. The crankshaft for a reciprocating engine according to claim 2,
   wherein the recess extends to a side area of the peripheral region.

5. The crankshaft for a reciprocating engine according to claim 2,
   wherein the recess extends to two side areas of the peripheral region, the recess being symmetrical with respect to a line connecting an axis of the corresponding one of the journals to the axis of the corresponding one of the crank pins.

6. The crankshaft for a reciprocating engine according to claim 1,
   wherein, of all the crank arms, a crank arm not having the counterweight has another recess in a surface adjacent to the corresponding one of the crank pins, the other recess disposed inward of a peripheral region along a periphery of the surface, the other recess disposed along the peripheral region.

7. The crankshaft for a reciprocating engine according to claim 2,
   wherein, of all the crank arms, a crank arm not having the counterweight has another recess in a surface adjacent to the corresponding one of the crank pins, the other recess disposed inward of a peripheral region along a periphery of the surface, the other recess disposed along the peripheral region.

8. The crankshaft for a reciprocating engine according to claim 3,
   wherein, of all the crank arms, a crank arm not having the counterweight has another recess in a surface adjacent to the corresponding one of the crank pins, the other recess disposed inward of a peripheral region along a periphery of the surface, the other recess disposed along the peripheral region.

9. The crankshaft for a reciprocating engine according to claim 4,
   wherein, of all the crank arms, a crank arm not having the counterweight has another recess in a surface adjacent to the corresponding one of the crank pins, the other recess disposed inward of a peripheral region along a periphery of the surface, the other recess disposed along the peripheral region.

10. The crankshaft for a reciprocating engine according to claim 5,
    wherein, of all the crank arms, a crank arm not having the counterweight has another recess in a surface adjacent to the corresponding one of the crank pins, the other recess disposed inward of a peripheral region along a periphery of the surface, the other recess disposed along the peripheral region.

* * * * *